(12) United States Patent
Hwang

(10) Patent No.: US 10,703,346 B2
(45) Date of Patent: Jul. 7, 2020

(54) BRAKE PEDAL APPARATUS FOR VEHICLE

(71) Applicant: SL Corporation, Daegu (KR)

(72) Inventor: Intae Hwang, Daegu (KR)

(73) Assignee: SL Corporation, Daegu (KR)

( * ) Notice: Subject to any disclaimer, the term of this patent is extended or adjusted under 35 U.S.C. 154(b) by 195 days.

(21) Appl. No.: 16/123,909

(22) Filed: Sep. 6, 2018

(65) Prior Publication Data

US 2019/0202419 A1    Jul. 4, 2019

(30) Foreign Application Priority Data

Dec. 28, 2017  (KR) .................. 10-2017-0182343

(51) Int. Cl.
| | |
|---|---|
| *B60T 7/22* | (2006.01) |
| *B60T 7/06* | (2006.01) |
| *B60R 21/09* | (2006.01) |
| *G05G 1/327* | (2008.04) |
| *B60T 17/18* | (2006.01) |
| *G05G 1/32* | (2008.04) |
| *G05G 1/44* | (2008.04) |

(52) U.S. Cl.
CPC ............... *B60T 7/22* (2013.01); *B60R 21/09* (2013.01); *B60T 7/06* (2013.01); *B60T 7/065* (2013.01); *B60T 17/18* (2013.01); *G05G 1/32* (2013.01); *G05G 1/327* (2013.01); *B60T 2201/03* (2013.01); *G05G 1/44* (2013.01)

(58) Field of Classification Search
CPC ... B60T 7/22; B60T 7/06; B60T 7/065; B60T 17/18; B60R 21/09; G05G 1/327
See application file for complete search history.

(56) References Cited

U.S. PATENT DOCUMENTS

| | | | | |
|---|---|---|---|---|
| 6,923,088 | B2* | 8/2005 | Burgstaler | ............. B60R 21/09 74/512 |
| 9,010,216 | B2* | 4/2015 | Burguera Albizuri | ... G05G 1/44 74/560 |
| 10,173,650 | B1* | 1/2019 | Harrison | .................. G05G 1/46 |
| 2004/0231452 | A1* | 11/2004 | Burgstaler | ............. G05G 1/327 74/560 |
| 2007/0000708 | A1* | 1/2007 | Himetani | ................ B60R 21/09 180/271 |
| 2019/0322250 | A1* | 10/2019 | Jarjoura | ................. G05G 1/327 |

* cited by examiner

*Primary Examiner* — Faye M Fleming
(74) *Attorney, Agent, or Firm* — Nelson Mullins Riley & Scarborough LLP; Kongsik Kim, Esq.

(57) ABSTRACT

A brake pedal apparatus for a vehicle is provided. The brake pedal apparatus includes a fixing bracket fixedly installed in a vehicle, a pedal arm coupled to the fixing bracket to be rotatable about a first axis, and a collision rack coupled to the fixing bracket to be rotatable about a second axis which is different from the first axis. The collision rack is configured to rotate upon a collision with a collision bracket. The fixing bracket supports the pedal arm to allow the pedal arm to be movable in a predetermined direction. The collision rack blocks the movement of the first axis of the pedal arm, and upon the collision with the collision bracket, the collision rack allows the pedal arm to be disengaged from the fixing bracket, thereby reducing the risk of injuring the driver.

16 Claims, 18 Drawing Sheets

BRAKE PEDAL APPARATUS FOR VEHICLE

CROSS-REFERENCE TO RELATED APPLICATION

This application claims priority to Korean Patent Application No. 10-2017-0182343, filed on Dec. 28, 2017, the disclosure of which is incorporated herein by reference in its entirety.

BACKGROUND

1. Field of the Disclosure

The present disclosure relates to a brake pedal apparatus for a vehicle, and more particularly, to a brake pedal apparatus for a vehicle which prevents the pedal of a vehicle from being pushed to the inside of the vehicle upon a collision (e.g., a forward collision) of the vehicle.

2. Description of the Related Art

A vehicle may collide even when the driver steps on the brake pedal to avoid the collision. When a forward collision occurs, the front part of the vehicle is destroyed absorbing the energy of the collision, and the engine in the engine room retreats while pushing the dash panel that separates the engine room and the vehicle room.

A brake boost is installed at the front of the dash panel, and the brake pedal, which is disposed at the rear of the dash panel, is connected to the brake boost via a push rod.

Accordingly, as the dash panel retreats, the brake pedal also retreats by being pushed by the dash panel via the push rod. As a result, the impact of the collision is transmitted to the driver's foot on the brake pedal, causing an injury to the driver.

To prevent the foot or the lower part of the body of the driver from being injured by the brake pedal in a forward collision of the vehicle, a structure that disengages the brake pedal or bends the installation part of the brake pedal when a strong impact is applied, for example, in a collision, is used. However, due to wear and tear or fatigue failure, the brake pedal may be accidently disengaged or may be damaged, even when no collision is involved, and as a result, the driver may be injured by the brake pedal or other elements.

SUMMARY

Exemplary embodiments of the present disclosure provide a brake pedal apparatus for a vehicle, which may operate stably both during a normal pedal operation and in case of a collision, and may reduce the risk of causing inconvenience or injury to the driver of a vehicle. Exemplary embodiments of the present disclosure provide a brake pedal apparatus for a vehicle, which may allow a pedal arm to be disengaged from a fixing bracket and to rotate in a direction that reduces a chance for injury to the driver of a vehicle.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, a brake pedal apparatus for a vehicle may include a fixing bracket fixedly installed in a vehicle; a pedal arm coupled to the fixing bracket to be rotatable about a first axis; a collision rack coupled to the fixing bracket to be rotatable about a second axis, which is different from the first axis; and a collision bracket configured to cause the collision rack to rotate upon a collision between the collision rack and the collision bracket, wherein the collision rack may block the first axis of the pedal arm from moving when the collision bracket is disposed at a distance from the collision rack, and the collision rack releases the first axis of the pedal arm and causes the pedal arm to be disengaged from the fixing bracket upon a collision between the collision bracket and the collision rack.

The brake pedal apparatus may further include a coupling shaft inserted through a proximal end of the pedal arm at the first axis to rotatably couple the pedal arm to the fixing bracket. The fixing bracket may include guide rails to movably support the coupling shaft. In addition, the fixing bracket may further include openings formed to communicate with the guide rails in a moving direction of the coupling shaft to allow the coupling shaft to be inserted thereinto or disengaged therefrom at a rear of the fixing bracket. Further, the coupling shaft may be disengaged from the fixing bracket by moving toward the openings along the guide rails. The brake pedal apparatus may include bushing members having hollows formed therein to receive the coupling shaft, wherein the bushing members include flange parts that are inserted in flange grooves formed at inner ends of the guide rails.

The collision rack may include blocking parts inserted in guide apertures that are formed to communicate with the guide rails in a direction that intersects a moving direction of the coupling shaft, to block the movement of the coupling shaft. Therefore, the location of the coupling shaft may be fixed by spaces formed by the guide rails and the blocking parts. The brake pedal apparatus may further include fixing parts for fixing the collision rack with respect to the fixing bracket, and the fixing parts may be inserted in fixing grooves of the blocking parts through fixing apertures of the fixing bracket. The fixing parts may be broken and/or removed upon the collision between the collision bracket and the collision rack to enable the rotation of the collision rack. In particular, the fixing parts, the first axis, and the second axis may be sequentially arranged in a direction from the rear to the front of the vehicle.

Further, ends of the blocking parts may be inserted into guide grooves formed in the guide rails to face the guide apertures, and engaging protrusions may be formed at the ends of the blocking parts to be hook-coupled to the guide grooves. Upon the collision between the collision bracket and the collision rack, the blocking parts may move along the guide apertures, due to a rotation of the collision rack, to open the guide rails. The collision rack may further include a collision member may collide with the proximal end of the pedal arm to allow the coupling shaft to move along the guide rails. In particular, surfaces of the guide rails that support the coupling shaft may be downwardly inclined toward the rear of the vehicle. The brake pedal apparatus may further include a hinge shaft coupled to the collision rack to be rotatable about the second axis, and the hinge shaft may be rotatably coupled to hinge grooves of the fixing bracket.

In operation, when the proximal end of the pedal arm is disengaged from the fixing bracket, the pedal arm may rotate to cause the proximal end of the pedal arm to move toward the rear of the vehicle, and a distal end of the pedal arm with respect to the first axis to move toward the front of the vehicle.

According to exemplary embodiments of the present disclosure, as the fixing parts may be broken and/or removed upon a collision, the collision rack may rotate, and the pedal arm may rotate away from the driver's leg. As a result, safety issues due to the brake pedal may be reduced.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
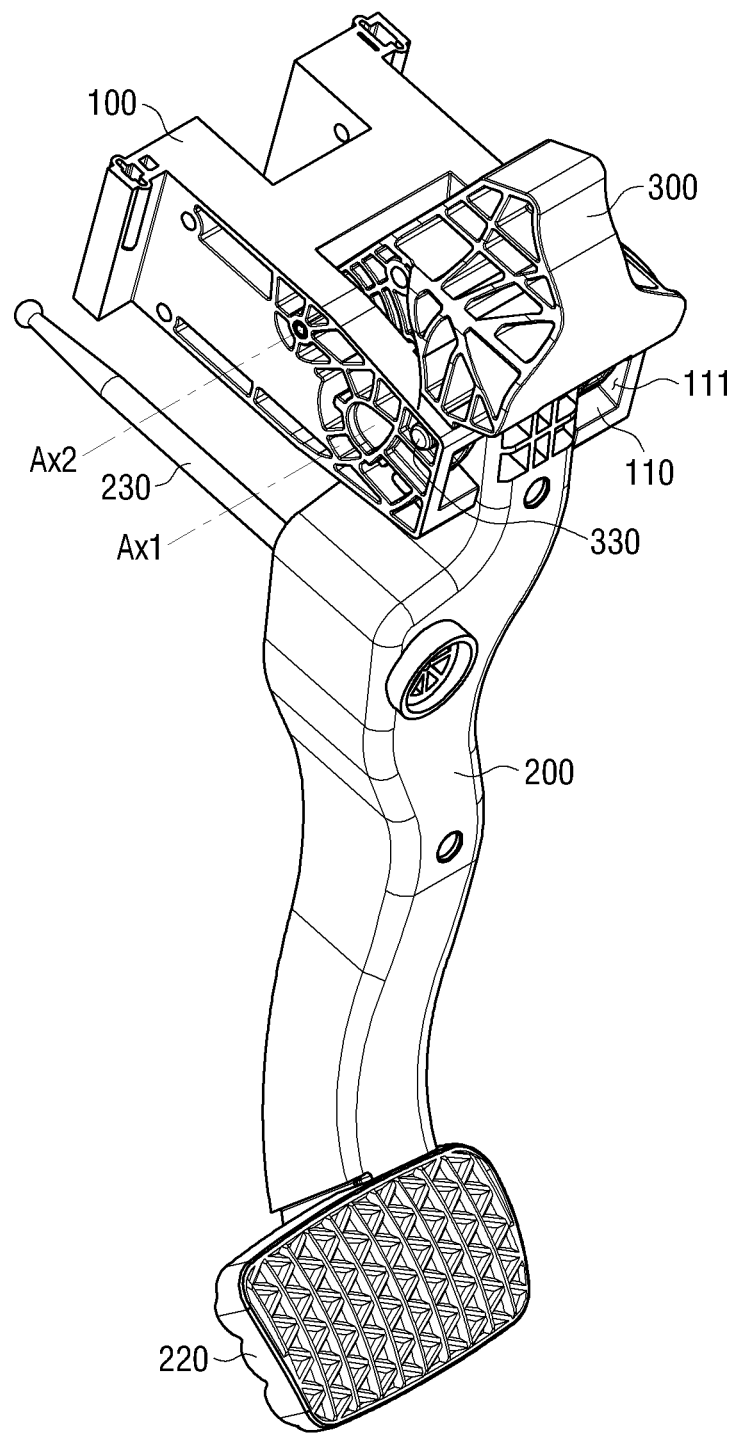
FIG. 1 is a perspective view of a brake pedal apparatus for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present disclosure and methods of accomplishing the same may be understood more readily by reference to the following detailed description of exemplary embodiments and the accompanying drawings. The present disclosure may, however, be embodied in many different provides and should not be construed as being limited to the embodiments set forth herein. Rather, these embodiments are provided to make this disclosure thorough and complete and to fully convey the concept of the present disclosure to those skilled in the art, and the present disclosure will only be defined by the appended claims. Like reference numerals refer to like elements throughout the specification.

In some exemplary embodiments, well-known processes, well-known structures, and well-known technologies are not described in detail to avoid unclear interpretation of the present disclosure.

Exemplary embodiments of the present disclosure will be described with perspective views and sectional views as ideal exemplary views of the inventive concept of the present disclosure. Accordingly, shapes of the exemplary views may be modified according to manufacturing techniques and/or tolerances. Therefore, exemplary embodiments of the present disclosure are not limited to the specific shapes illustrated in the exemplary views, but may include other shapes that may be created according to manufacturing processes. In the drawings, the dimensions of elements and regions are exaggerated for clarity.

Exemplary embodiments of the present disclosure will hereinafter be described with reference to the accompanying drawings.

Figure 2:
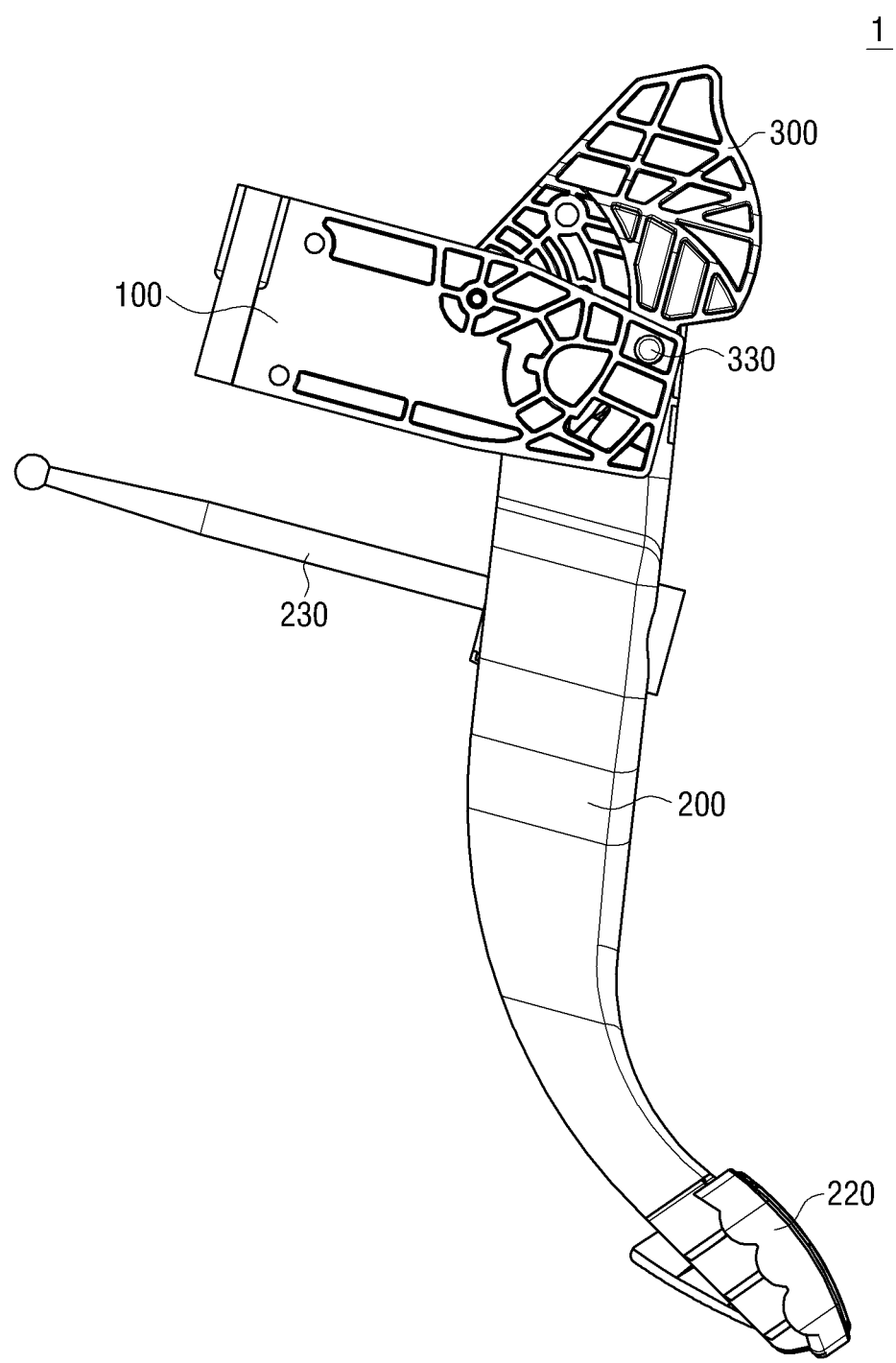
FIG. 2 is a side view of the brake pedal apparatus of FIG. 1 according to an exemplary embodiment of the present disclosure.
Figure 3:
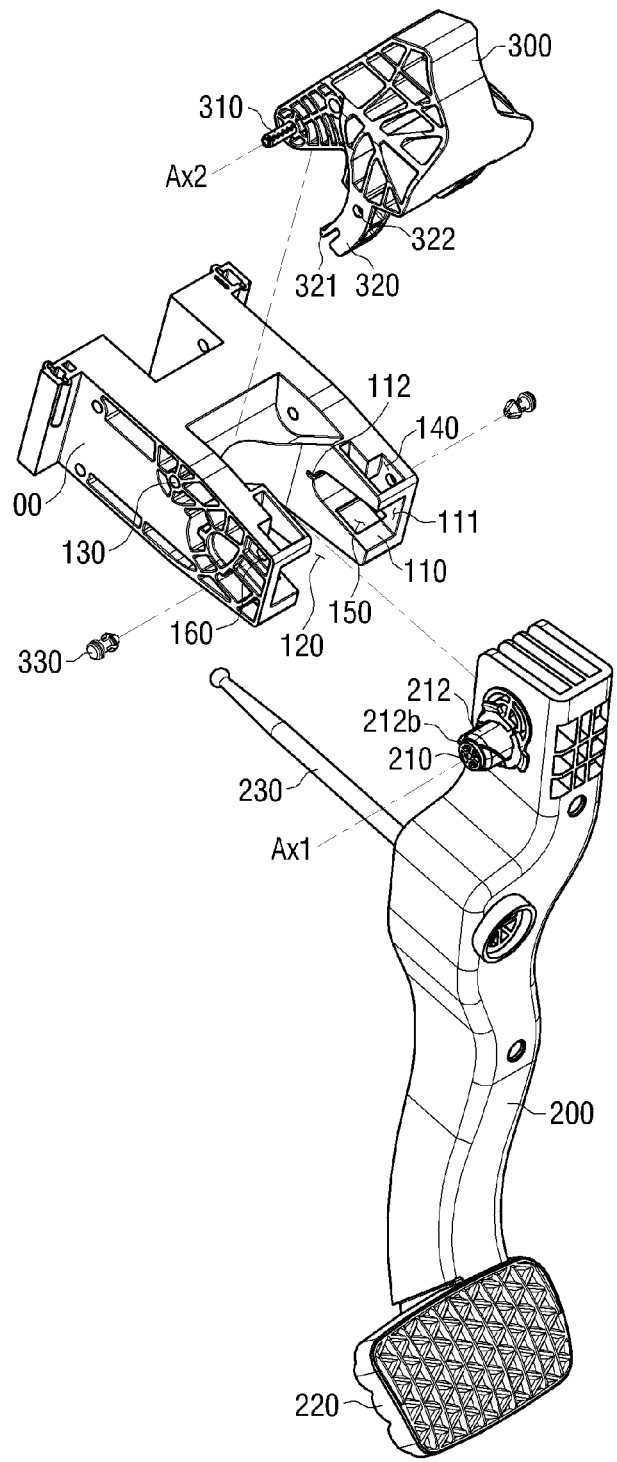
FIGS. 3 to 5 are exploded perspective views of the brake pedal apparatus of FIG. 1 according to an exemplary embodiment of the present disclosure.
Figure 4:
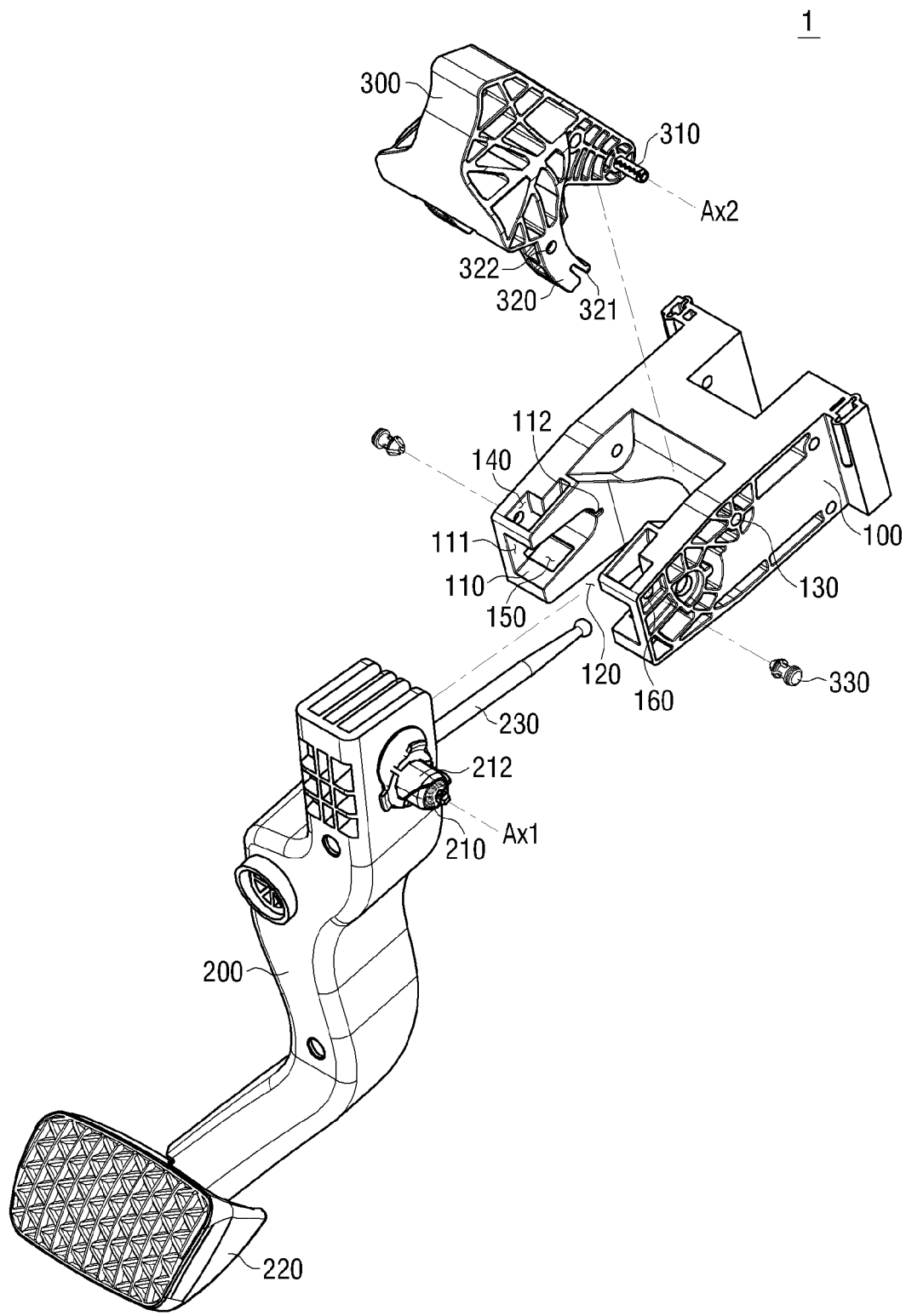
Figure 5:
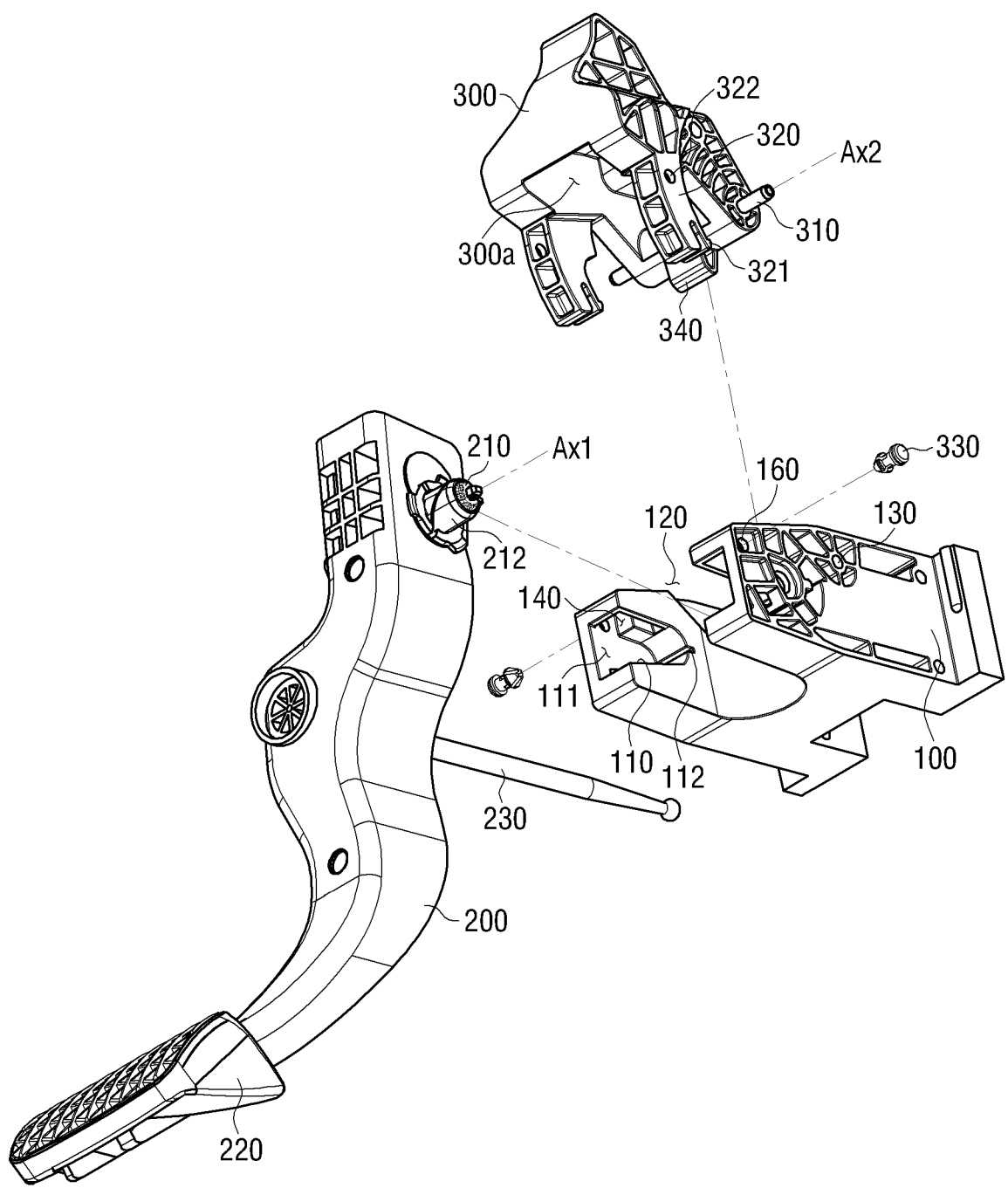

FIG. 1 is a perspective view of a brake pedal apparatus for a vehicle according to an exemplary embodiment of the present disclosure, FIG. 2 is a side view of the brake pedal apparatus of FIG. 1, and FIGS. 3 through 5 are exploded perspective views of the brake pedal apparatus of FIG. 1. Referring to FIGS. 1 through 5, a brake pedal apparatus 1 for a vehicle may include a fixing bracket 100, a pedal arm 200, and a collision rack 300.

The brake pedal apparatus 10 may prevent a brake pedal from being pushed backwards and injuring a driver's leg in a forward collision, but may also be applied to other various pedals (e.g., an accelerator pedal or a clutch pedal) installed in the vehicle to prevent them from being pushed backwards. The fixing bracket 100 may be fixedly mounted on the vehicle, and the pedal arm 200 and the collision rack 300 may be rotatably coupled to the fixing bracket 100. The pedal arm 200 may be coupled to the fixing bracket 100 to be rotatable about a first axis Ax1, and a coupling shaft 210 may be formed at the pedal arm 200 to be rotatable about the first axis Ax1.

Figure 6:
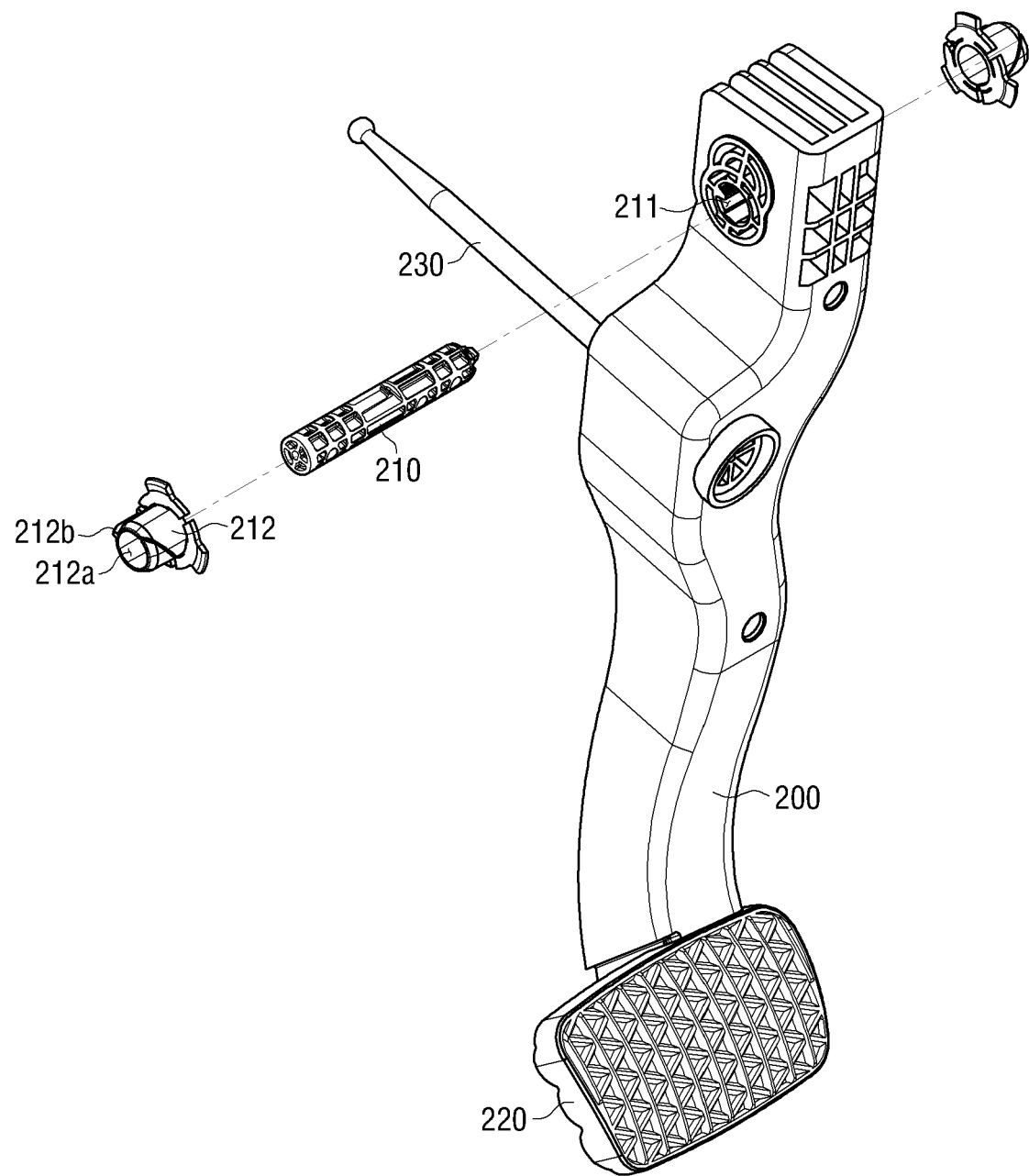
FIG. 6 is an exploded perspective view illustrating a pedal arm according to an exemplary embodiment of the present disclosure.

The coupling shaft 210 may be coupled to the pedal arm 200 by being inserted in a coupling aperture 211, which is formed at a proximal end of the pedal arm 200 with respect to the first axis Ax1, as illustrated in FIG. 6, but the present disclosure is not limited thereto. The coupling shaft 210 may be formed integrally with the pedal arm 200. Bushing members 212 may be coupled to both ends of the coupling shaft 210. Hollows 212a may be formed at the bushing members 212, and the coupling shaft 210 may be inserted in the hollows 212a to be rotatable about the first axis Ax1. When the pedal arm 200 rotates about the first axis Ax1, the bushing members 212 may prevent the structural interference between the coupling shaft 210 and the surroundings of the coupling shaft 210 and may thus enable the coupling shaft 210 to smoothly rotate.

A pedal pad 220 may be formed at the pedal arm 220 to allow the driver to apply a pressing force to a distal end of the pedal arm 220 with respect to the first axis Ax1, and a push rod 230 may be coupled to the front of the pedal arm 200 to transmit the pressing force applied by the pedal pad 220 to an electronic control device or a master cylinder (or a brake boost). The pedal arm 200 may be coupled to the fixing bracket 100 to be movable in a predetermined direction. During a normal pedal operation, the movement of the pedal arm 200 may be blocked, but in a collision, the pedal arm 200 may become movable and may thus be disengaged from the fixing bracket 100.

To this end, the fixing bracket 100 may include guide rails 110 that movably support the coupling shaft 210 of the pedal arm 200. One side of the fixing bracket 100 may be open to form an insertion groove 120, into which the proximal end of the pedal arm 200 may be inserted. The guide rails 110 may be formed on both opposite sides of the insertion groove 120 and may thus movably support both ends of the coupling shaft 210.

Since both ends of the coupling shaft 210 may be inserted in the hollows 212a of the bushing members 212, the guide rails 110 may be understood as movably supporting the bushing members 212 in which both ends of the coupling shaft 210 may be inserted. The coupling shaft 210 will hereinafter be described as being movably supported by the guide rails 110, but the bushing members 212 may also be movably supported by the guide rails 110.

Figure 7:
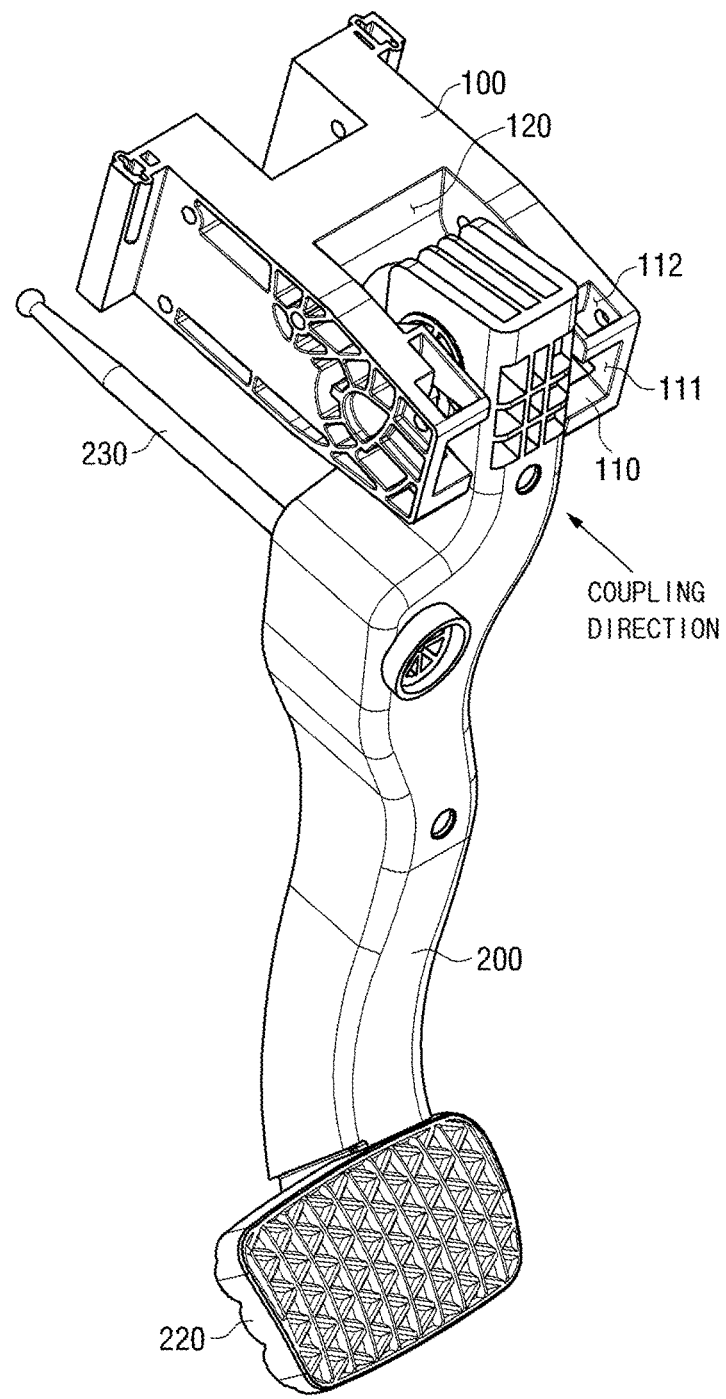
FIG. 7 is a perspective view illustrating a fixing bracket and a pedal arm according to an exemplary embodiment of the present disclosure.
Figure 8:
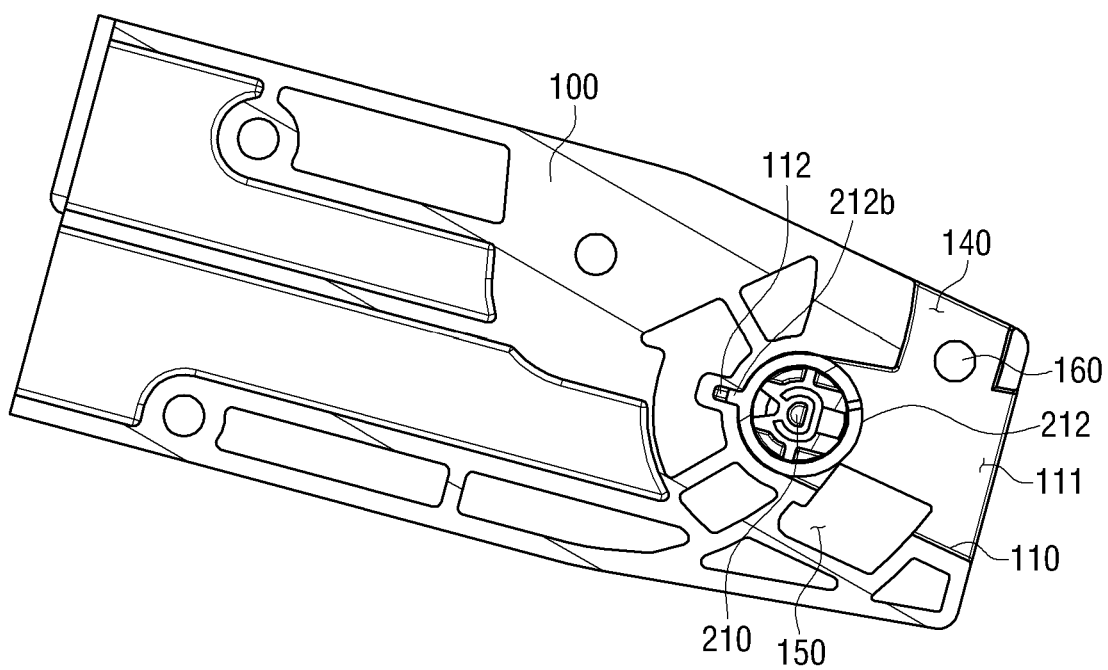
FIG. 8 is a cross-sectional view illustrating a coupling shaft inserted in guide rails, according to an exemplary embodiment of the present disclosure.

Openings 111, which communicate with the guide rails 110, may be formed on first sides of the guide rails 110 with respect to the moving direction of the coupling shaft 210, and since both ends of the coupling shaft 210 may be inserted in the guide rails 110 via the openings 111, the proximal end of the pedal arm 200 may be inserted in the insertion groove 120 of the fixing bracket 100, as illustrated in FIG. 7.

As described above, during a normal pedal operation, the movement of the pedal arm 200 may be blocked. In other words, once the coupling shaft 210 is inserted in the guide rails 110, the location of the coupling shaft 210 may be fixed and the coupling shaft 210 may become rotatable about the first axis Ax1, instead of moving along the guide rails 110. Conversely, as described above, the pedal arm 200 may become movable upon a collision. In other words, the coupling shaft 210 may become movable toward the openings 111 along the guide rails 110.

The coupling shaft 210 of the pedal arm 200 may be made movable toward the openings 111 along the guide rails 110 in order for the pedal arm 200 to be disengaged from the fixing bracket 100 upon a collision and to rotate in the opposite direction to the driver's leg. Accordingly, injury to the driver's leg may be prevented. This will be described later in detail.

Flange grooves 112, in which flange parts 212b formed at the bushing members 212 may be inserted, may be formed at the inner ends of the guide rails 110 in a direction in which the coupling shaft 210 may be inserted into the guide rails 110. When the pedal arm 200 rotates about the first axis Ax1, the flange parts 212a of the bushing members 212 may be inserted in the flange grooves 112 to fix the locations of the bushing members 212, and the coupling shaft 210 may rotate inside the hollows 212a of the bushing members 212. As a result, structural interference between the coupling shaft 210 and the surroundings of the coupling shaft 210 may be prevented, and the coupling shaft 210 may smoothly rotate.

Figure 9:
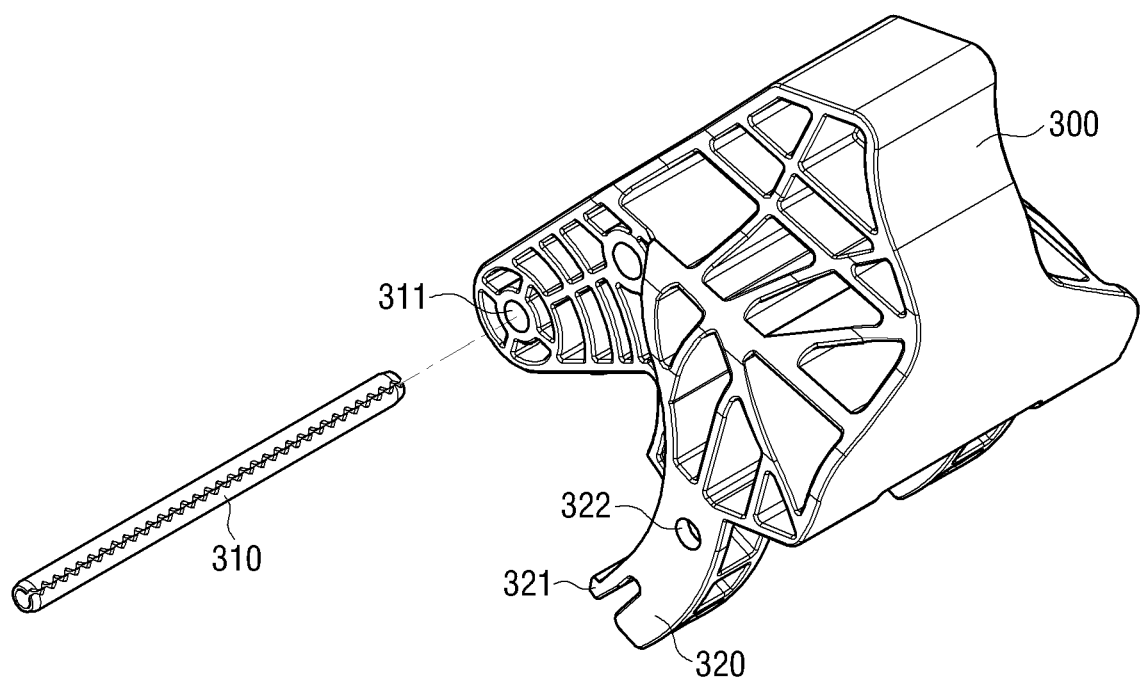
FIG. 9 is an exploded perspective view illustrating a collision rack according to an exemplary embodiment of the present disclosure.

The collision rack 300 may be coupled to the fixing bracket 100 to be rotatable about a second axis Ax2. The collision rack 300 may be rotatable about a hinge shaft 310, which may be inserted into a hinge aperture 311, as illustrated in FIG. 9. The collision rack 300 may be rotatably coupled to the fixing bracket 100 by inserting both ends of the hinge shaft 310 in hinge grooves 130 formed at the fixing bracket 100.

To prevent structural interference between the proximal end of the pedal arm 200 and the collision rack 300 when the pedal arm 200 rotates about the first axis Ax1, a side of the collision rack 300 that faces the proximal end of the pedal arm 200 may be open to form a receiving space (e.g., a receiving cavity) 300a in the collision rack 300 to receive the proximal end of the pedal arm 200, but the present disclosure is not limited thereto. The receiving space 300a may not be provided depending on the shapes and the structures of the pedal arm 200 and the collision rack 300.

The collision rack 300 may include blocking parts 320. During a normal pedal operation, the blocking parts 320 may be inserted in guide apertures 140, which may be formed to communicate with the guide rails 110 in a direction that intersects the moving direction of the coupling shaft 210 in the guide rails 110 of the fixing bracket 100, and may thus be disposed on the moving path of the coupling shaft 210 to block or lock the movement of the coupling shaft 210. Since a pair of guide rails 110 may be formed on both sides of the insertion groove 120, a pair of blocking parts 320 may be formed.

Figure 10:
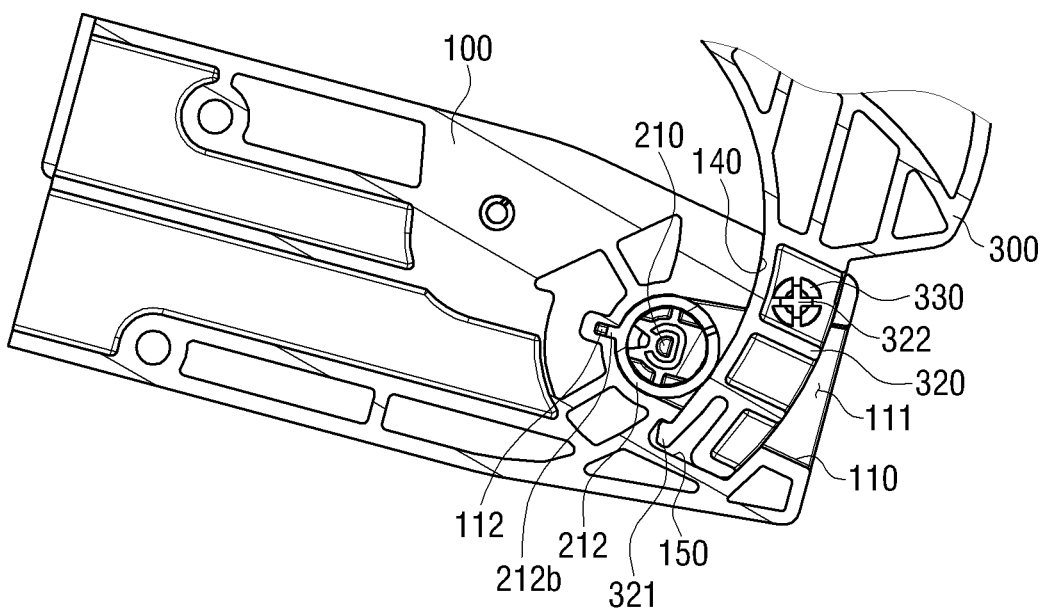
FIG. 10 is a cross-sectional view illustrating the location of a collision rack during a normal pedal operation, according to an exemplary embodiment of the present disclosure.

Referring to FIG. 10, the blocking parts 320 may be disposed to abut second sides of the bushing members 212 while maintaining the flange parts 212b formed at first sides of the bushing members 212 to be inserted in the flange grooves 112 at the inner ends of the guide rails 110. As a result, the locations of the bushing members 212 may be fixed by the spaces formed by the guide rails 110 and the blocking parts 320.

In other words, the guide rails 110 and the blocking parts 320 may be placed at least partially in contact with the outer sides of the bushing members 212. As a result, during a normal pedal operation, the coupling shaft 210 may be rotatable about the first axis Ax1 with its location fixed with respect to the guide rails 110.

The ends of the blocking parts 320 may be inserted in guide grooves 150, which may be formed in the guide rails 110 to face the guide apertures 140, and engaging protrusions 321 may be formed at the ends of the blocking parts 320 and may be hook-coupled to the guide grooves 150. The engaging protrusions 321 may be elastically deformable to be prevented from being disengaged from the guide grooves 150 unless an external force exceeding a predetermined level is applied thereto.

The blocking parts 320 may be formed to have a curved shape for a smooth rotation of the collision rack 300, but the present disclosure is not limited thereto. The blocking parts 320 may have various shapes, such as a linear shape, a curved shape, or the combination thereof, depending on the size and the shape of the guide apertures 140.

The collision rack 300 may be fixed by the fixing parts 330, which may be coupled between the fixing bracket 100 and the blocking parts 320, and may be prevented from rotating with respect to the fixing bracket 100 during a normal pedal operation.

The fixing parts 330 may be coupled to the fixing grooves 322, which may be formed in the blocking parts 320, via fixing apertures 160, which may be formed in the fixing bracket 100, and may fix the collision rack 300 not to rotate with respect to the fixing bracket 100. The fixing parts 330 may have, for example, a pin structure, but the present disclosure is not limited thereto. The fixing parts 330 may have various structures such as a bolt structure, a rivet structure, or the like.

Figure 11:
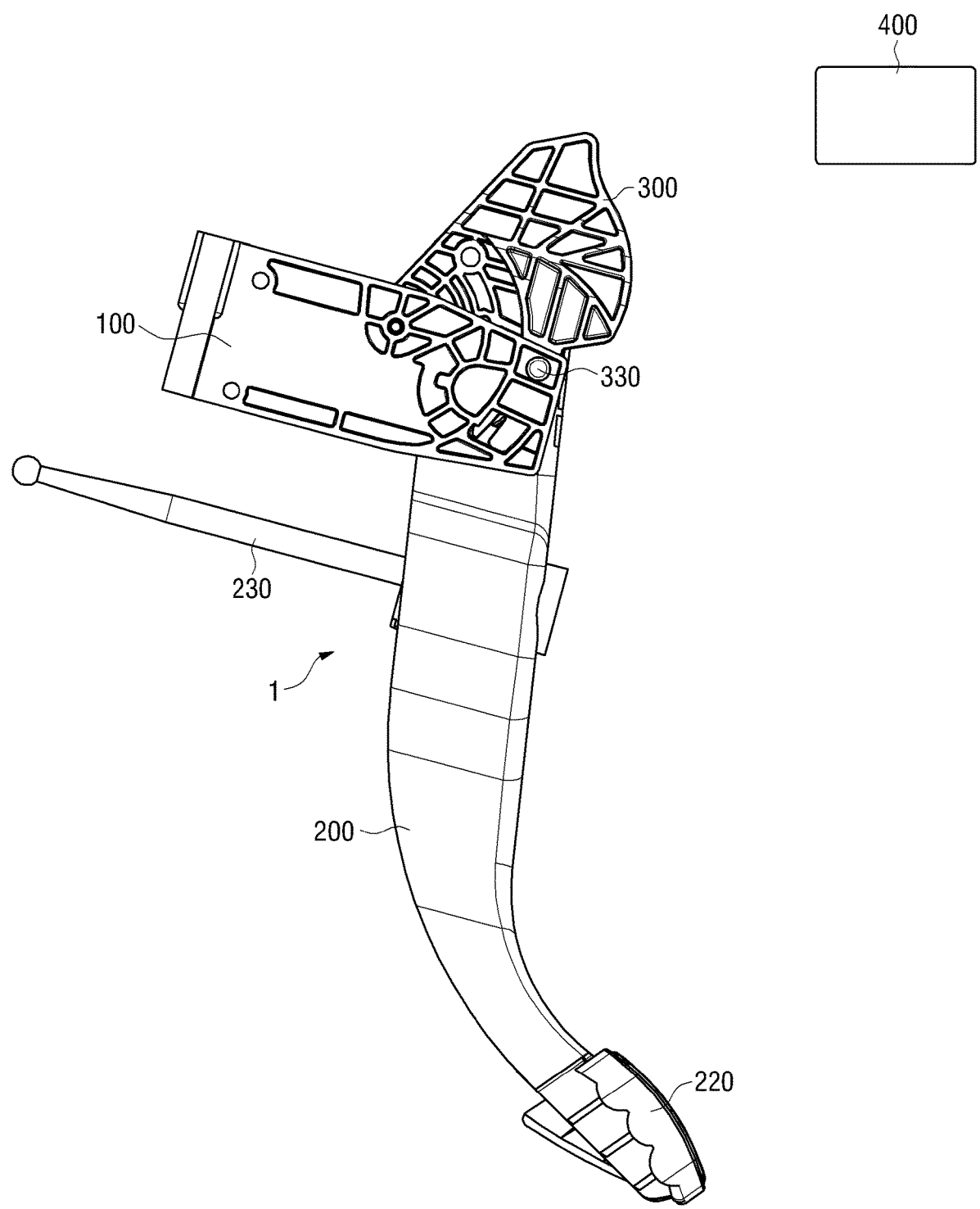
FIG. 11 is a side view illustrating a collision bracket colliding with a collision rack, according to an exemplary embodiment of the present disclosure.
Figure 12:
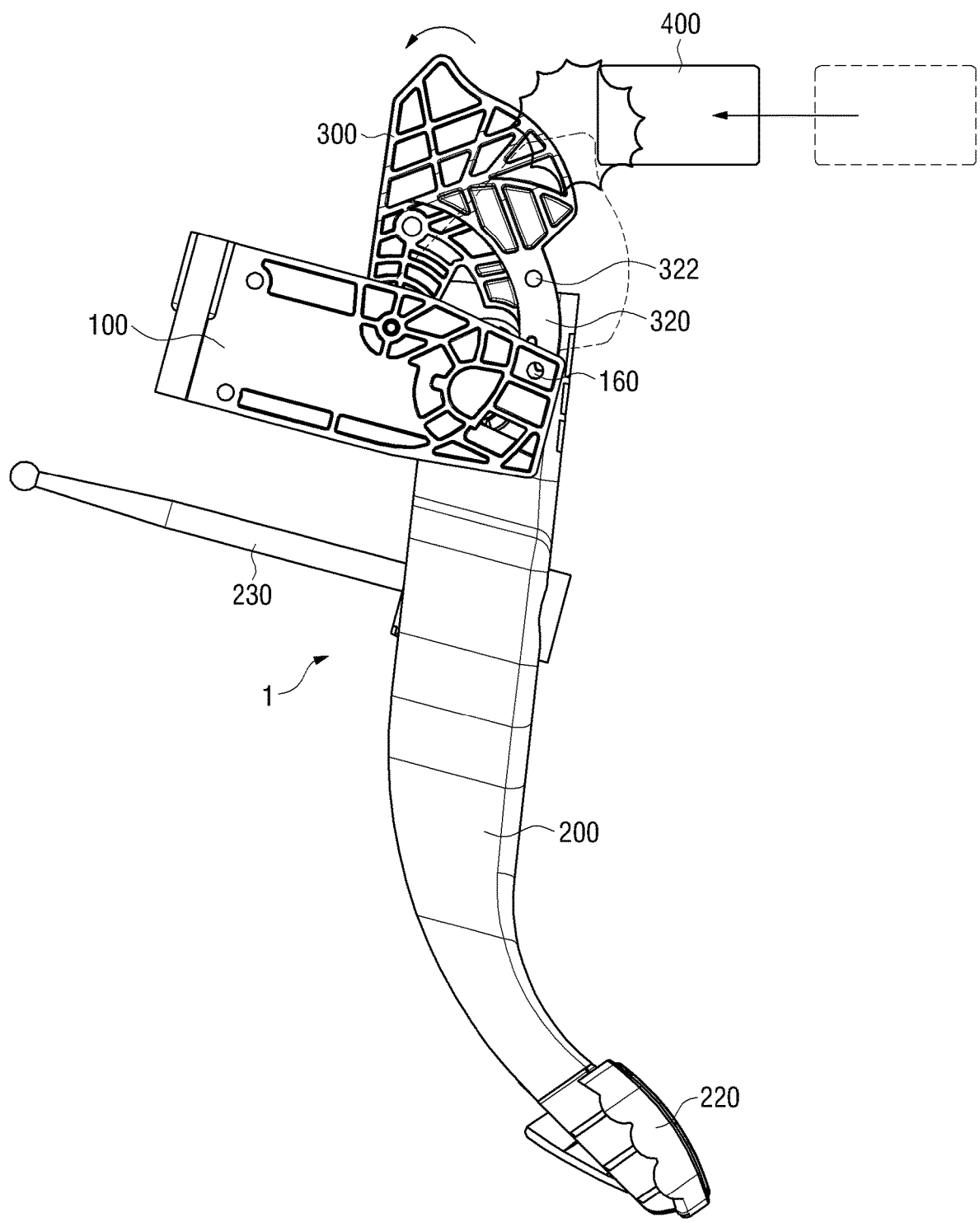
FIG. 12 is a side view illustrating a collision rack rotating upon a collision with a collision bracket, according to an exemplary embodiment of the present disclosure.
Figure 13:
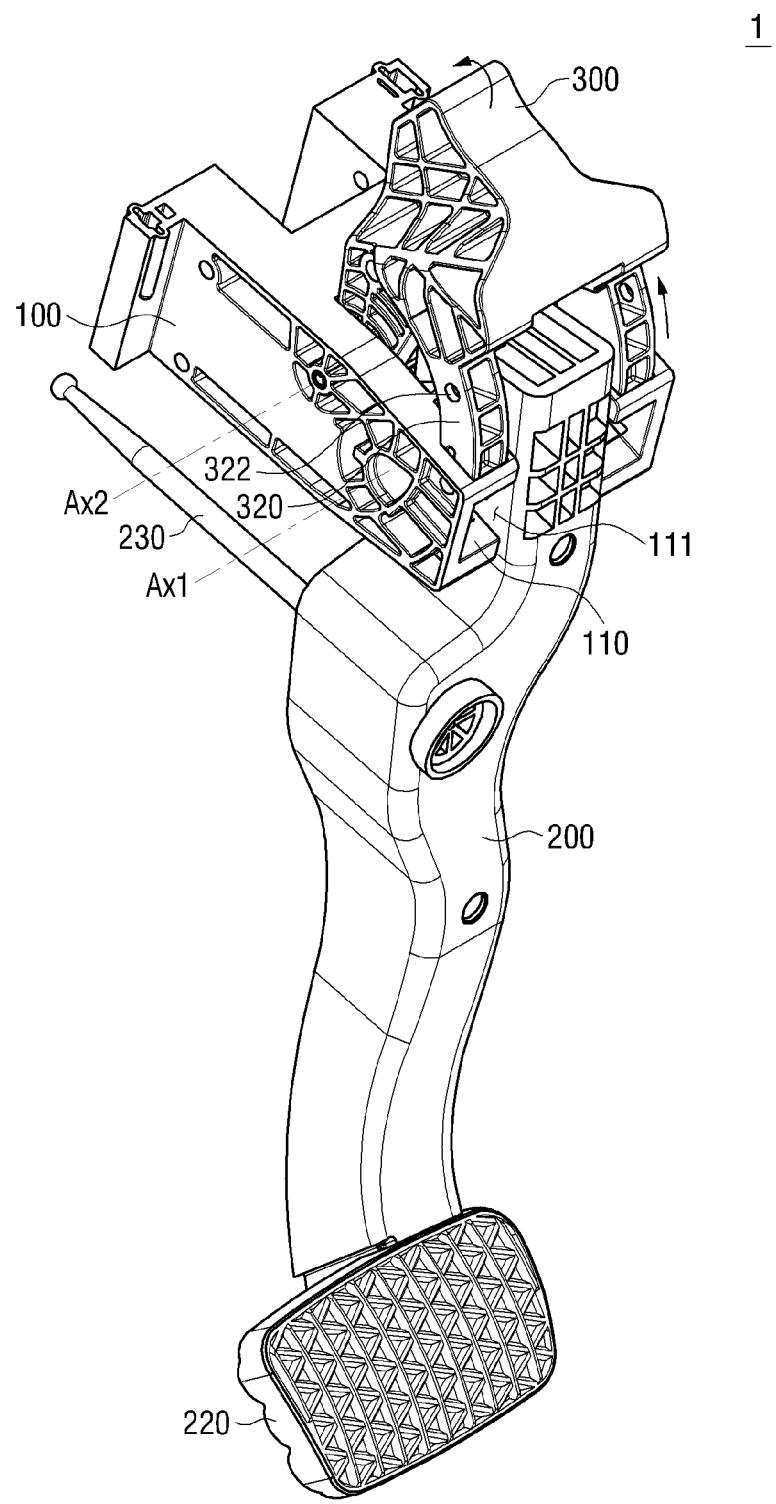
FIG. 13 is a perspective view illustrating a collision rack rotating upon a collision with a collision bracket, according to an exemplary embodiment of the present disclosure.

A collision bracket 400 may be disposed at a predetermined distance apart from one side of the top of the collision rack 300, as illustrated in FIG. 11. When the collision bracket 400 moves forward due to a collision, the collision rack 300 may collide with the collision bracket 400 to rotate about the second axis Ax2, i.e., the hinge shaft 310, as illustrated in FIGS. 12 and 13.

Since the collision rack 300 may rotate about the hinge shaft 310, which may be coupled to the fixing bracket 100, the collision rack 300 may be prevented from being disengaged from the fixing bracket 100 by the impact applied thereto by the collision bracket 400 when colliding with the collision bracket 400. Accordingly, the reliability of the operation of the collision rack 300 in a collision may be improved. In other words, when the collision rack 300 collides with the collision bracket 400 to cause the collision rack 300 to rotate about the second axis Ax2, the collision rack 300 may be prevented from being disengaged from the fixing bracket 100 due to the hinge shaft 310, and thus, a collision member 340 of the collision rack 300 may be prevented from failing to collide with the proximal end of the pedal arm 200.

The collision bracket 400 may be fixed to a cowl panel, which may be coupled to a dash panel, but the present disclosure is not limited thereto. The location of the collision bracket 400 may vary depending on the layout of the vehicle.

The forward movement of the collision bracket 400 may mean the relative movement of the collision bracket 400 with respect to the collision rack 300, and it should be understood that the collision rack 300 may move backward (e.g., toward the driver or toward a rear of the vehicle), the collision bracket 400 may move forward (e.g., toward a front of the vehicle), or both, to cause the collision rack 300 and the collision bracket 400 to collide.

In order for the collision rack 300 to be rotatable about the second axis Ax2 upon a collision with the collision bracket 400, the fixing parts 300 may be removed or destroyed. For example, the fixing parts 330 may be designed to have a failure strength that is adequate to be broken and/or removed when the collision rack 300 and the collision bracket 400 collide with each other.

When the collision rack 300 collides with the collision bracket 400, the collision bracket 400 may collide with one side of the top of the collision rack 300 and may apply a force in a direction toward the front of the vehicle. Subsequently, the fixing parts 330 may be broken and/or removed, and the collision rack 300 may rotate about the second axis Ax2 in the direction toward the front of the vehicle to move the blocking parts 320 through the guide apertures 140. As a result, as illustrated in FIG. 14, the guide rails 110 may be open, and the coupling shaft 210 may become movable toward the openings 111.

In other words, when the collision rack 300 collides with the collision bracket 400 to cause the top of the collision rack 300 to rotate in the direction toward the front of the vehicle, the ends of the blocking parts 320 may be disengaged from the guide grooves 150 and move along the guide apertures 140 to be disengaged from the fixing bracket 100. As a result, the guide rails 110 may be open.

Figure 14:
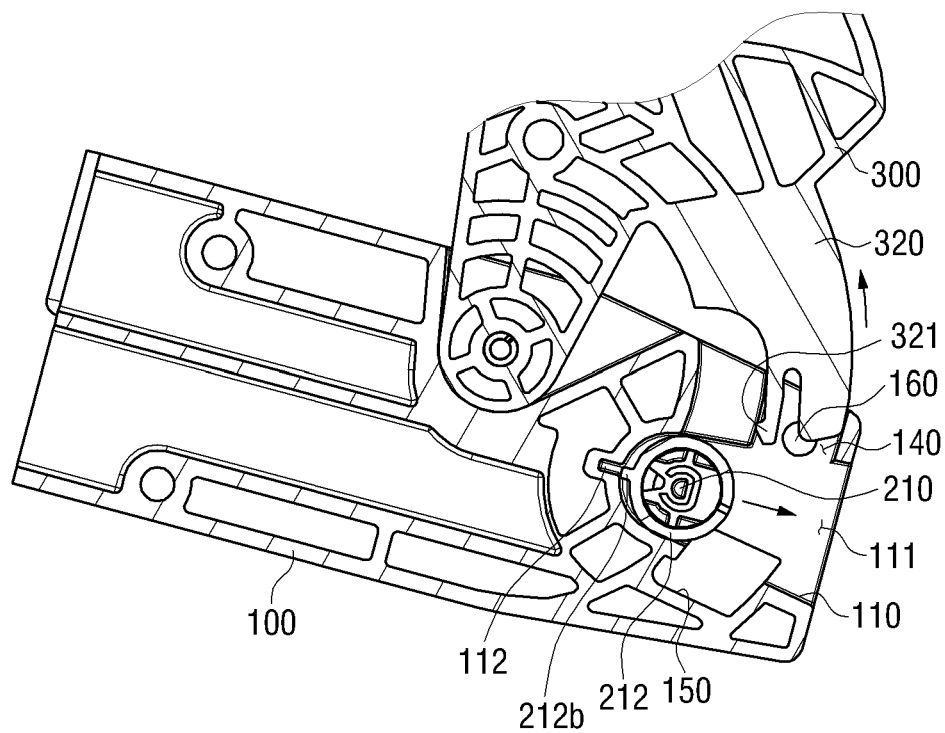
FIG. 14 is a cross-sectional view illustrating the location of a collision rack in a collision, according to an exemplary embodiment of the present disclosure.
Figure 15:
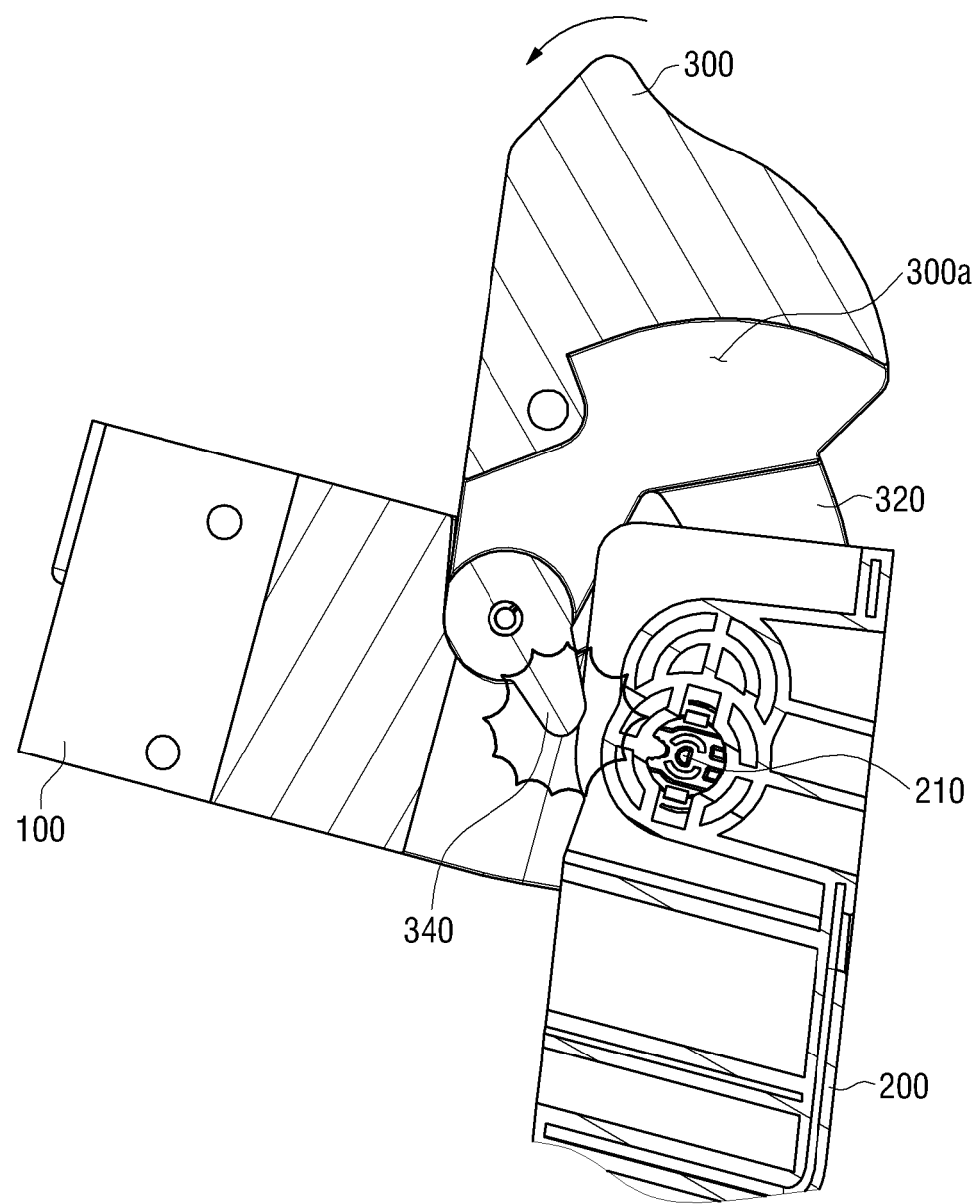
FIG. 15 is a cross-sectional view illustrating the location of a collision member during a normal pedal operation, according to an exemplary embodiment of the present disclosure.

Accordingly, when the collision rack 300 collides with the collision bracket 400 and rotates, the coupling shaft 210 coupled to the pedal arm 200, may move toward the openings 111 along the guide rails 110, as illustrated in FIG. 14, by receiving a force from the collision member 340, which may be formed at the collision rack 300 to collide with the proximal end of the pedal arm 200, as illustrated in FIG. 15.

Figure 16:
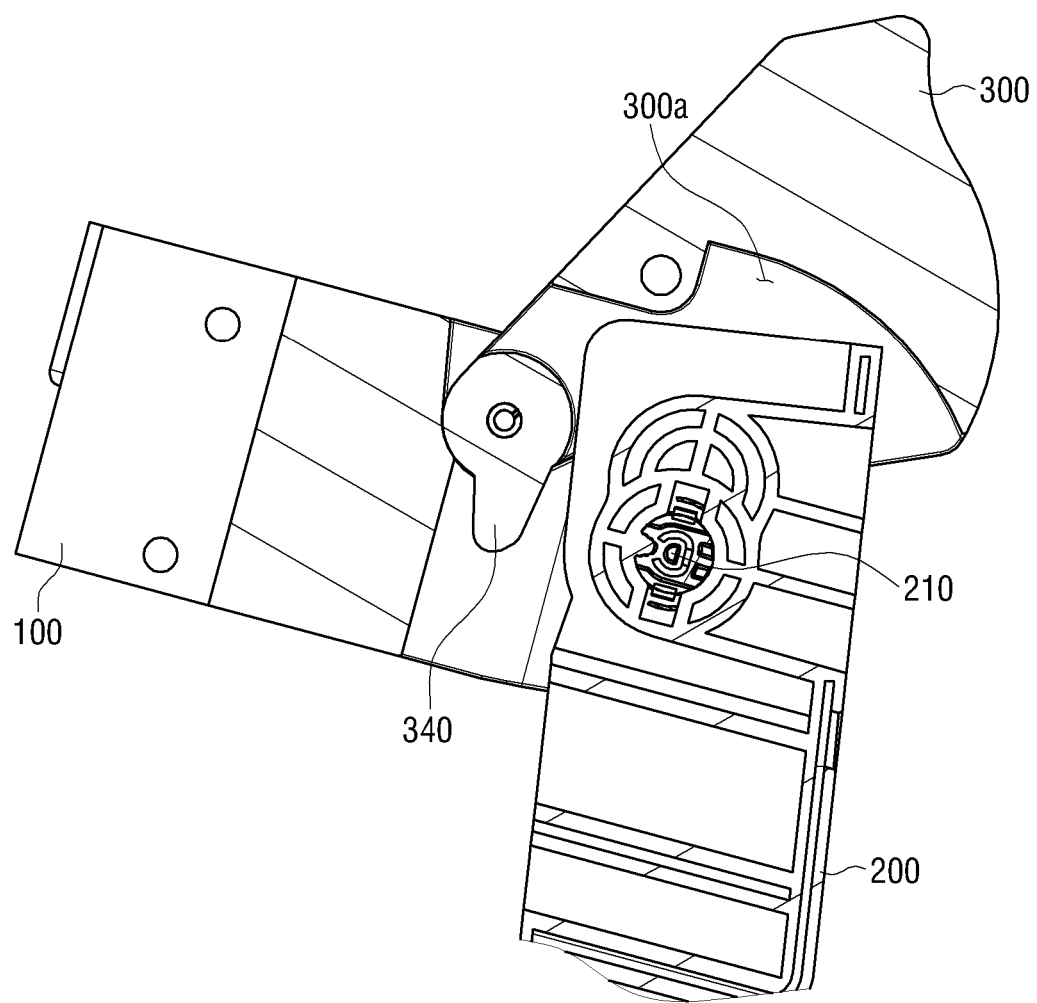
FIG. 16 is a cross-sectional view illustrating the location of a collision member during a normal pedal operation, according to an exemplary embodiment of the present disclosure.

During a normal pedal operation, i.e., when the collision rack 300 is disposed to block the guide rails 110 with the blocking parts 320, the collision member 340 may be disposed at a predetermined distance apart from the proximal end of the pedal arm 200, as illustrated in FIG. 16. On the other hand, when the collision rack 300 collides with the collision bracket 400 and rotates, the collision member 340 may collide with the proximal end of the pedal arm 200 to apply a force to the proximal end of the pedal arm 200, as illustrated in FIG. 15, and as a result, the pedal arm 200 may move toward the openings 111 along the guide rails 110.

As described above, due to the force applied by the collision member 340 to the proximal end of the pedal arm 200, the pedal arm 200, particularly, the coupling shaft 210, may move from the inner ends of the guide rails 110 to the openings 111, and subsequently, the coupling shaft 210 may be disengaged from the fixing bracket 100 through the openings 111.

To this end, the second axis Ax2 may be disposed closer than the first axis Ax1 to the front of the vehicle, and the fixing parts 330 may be disposed closer than the first axis Ax2 to the rear of the vehicle. However, the arrangement between the first axis Ax1, the second axis Ax2, and the fixing parts 330 is not limited thereto.

Figure 17:
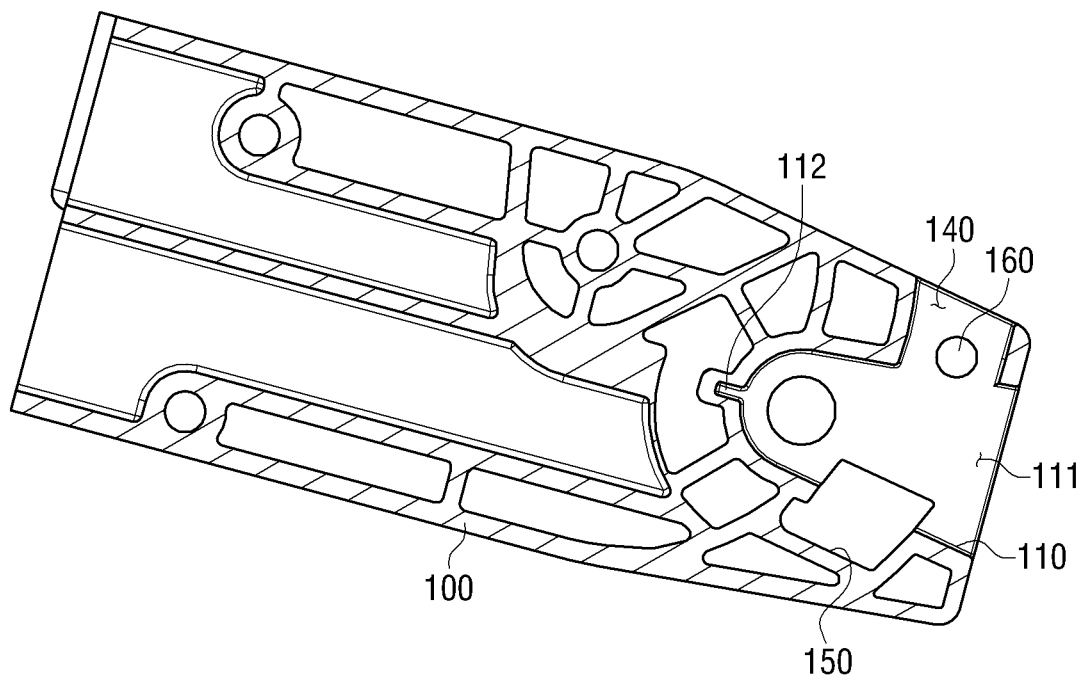
FIG. 17 is a cross-sectional view illustrating a fixing bracket according to an exemplary embodiment of the present disclosure.

As illustrated in FIG. 17, the surfaces of the guide rails 110 that support the coupling shaft 210 may be downwardly inclined toward the rear of the vehicle. As a result, the pedal arm 200 may be smoothly disengaged from the fixing bracket 100, and the proximal end of the pedal arm 200, particularly, the pedal pad 220, may be allowed to move in the opposite direction to the front of the vehicle, i.e., in a direction away from the driver's leg. Accordingly, injury to the driver's leg may be prevented. Moreover, since the pedal arm 200 may be coupled to the push rod 230, any additional damage that may be caused by the separation of the pedal arm 200 may be prevented, even if the pedal arm 200 is disengaged from the fixing bracket 100.

Figure 18:
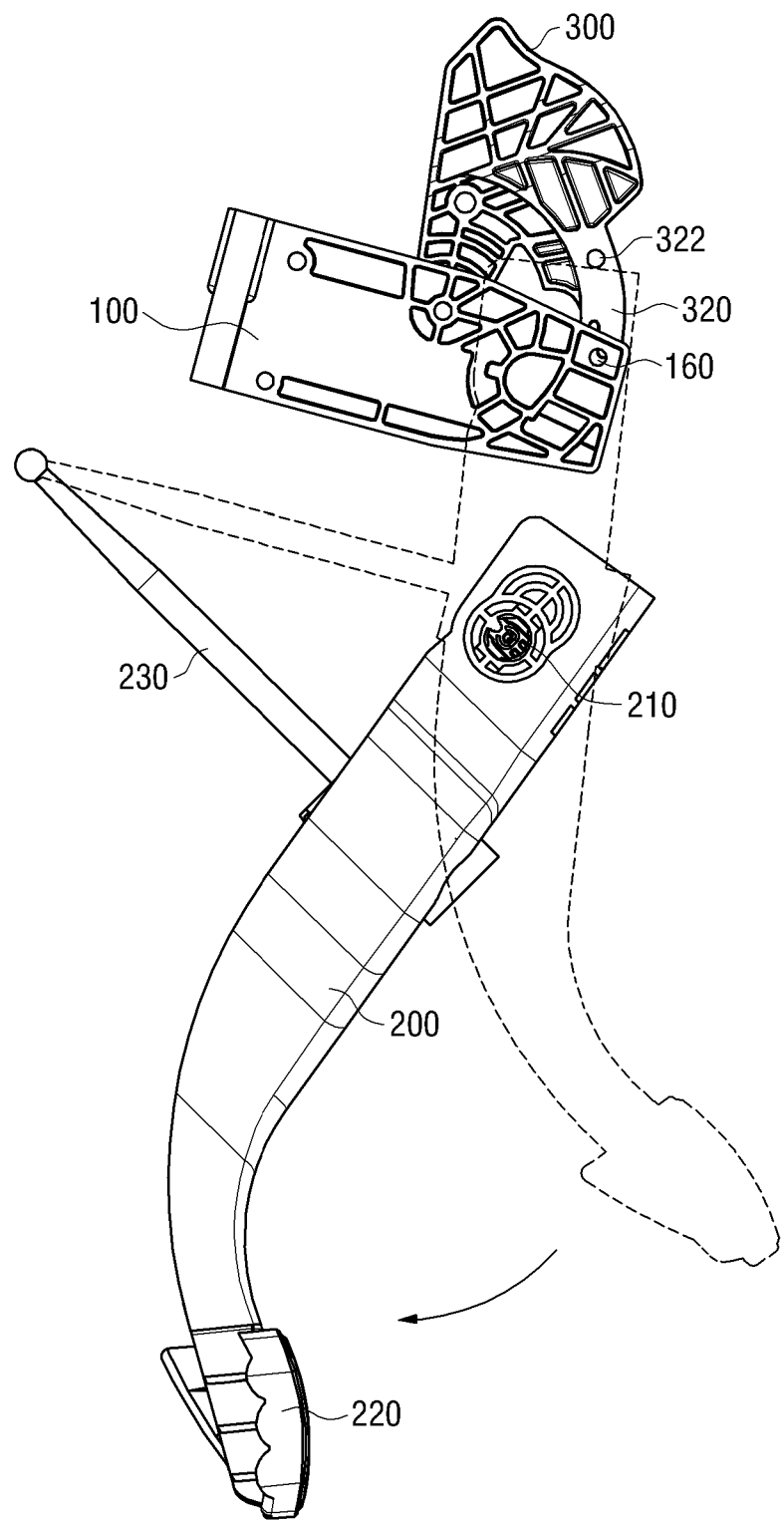
FIG. 18 is a side view illustrating the location of a pedal arm in a collision, according to an exemplary embodiment of the present disclosure.

As described above, upon a collision, the proximal end of the pedal arm 200 may be disengaged from the fixing bracket 100 in a direction toward the rear of the vehicle and the pedal pad 220 may move toward the front of the vehicle. As illustrated in FIG. 18, the pedal arm 200 may rotate in a direction away the driver's leg, thereby preventing injury to the driver's leg.

While exemplary embodiments of the present disclosure are described above, it is not intended that these exemplary embodiments describe all possible forms of the present disclosure. Rather, the words used in the specification are words of description rather than limitation, and it is understood that various changes may be made without departing from the spirit and scope of the inventive concept of the present disclosure. Additionally, the features of various exemplary embodiments may be combined to form further embodiments of the inventive concept of the present disclosure.

What is claimed is:

1. A brake pedal apparatus for a vehicle, comprising:
   a fixing bracket fixedly installed in a vehicle;
   a pedal arm coupled to the fixing bracket to be rotatable about a first axis;
   a collision rack coupled to the fixing bracket to be rotatable about a second axis, which is different from the first axis; and
   a collision bracket configured to cause the collision rack to rotate by colliding thereto,
   wherein the collision rack blocks the movement of the first axis of the pedal arm when the collision bracket is disposed at a distance from the collision rack, and
   the collision rack releases the first axis of the pedal arm and causes the pedal arm to be disengaged from the fixing bracket upon a collision between the collision bracket and the collision rack.

2. The brake pedal apparatus of claim 1, further comprising a coupling shaft inserted through a proximal end of the pedal arm at the first axis to rotatably couple the pedal arm to the fixing bracket, wherein the fixing bracket includes guide rails to movably support the coupling shaft.

3. The brake pedal apparatus of claim 2, wherein the fixing bracket further includes openings formed to communicate with the guide rails in a moving direction of the coupling shaft to allow the coupling shaft to be inserted thereinto or disengaged therefrom at a rear of the fixing bracket.

4. The brake pedal apparatus of claim 3, wherein the coupling shaft is configured to be disengaged from the fixing bracket by moving toward the openings along the guide rails.

5. The brake pedal apparatus of claim 3, further comprising:
   bushing members having hollows formed therein to receive the coupling shaft, wherein the bushing members include flange parts that are inserted in flange grooves formed at inner ends of the guide rails.

6. The brake pedal apparatus of claim 2, wherein the collision rack includes blocking parts inserted in guide apertures that are formed to communicate with the guide rails in a direction that intersects a moving direction of the coupling shaft, to block the movement of the coupling shaft.

7. The brake pedal apparatus of claim 6, wherein the location of the coupling shaft is fixed by spaces formed by the guide rails and the blocking parts.

8. The brake pedal apparatus of claim 6, further comprising:
   fixing parts for fixing the collision rack with respect to the fixing bracket,
   wherein the fixing parts are inserted in fixing grooves of the blocking parts through fixing apertures of the fixing bracket.

9. The brake pedal apparatus of claim 8, wherein the fixing parts are configured to be broken and/or removed upon the collision between the collision bracket and the collision rack to enable the rotation of the collision rack.

10. The brake pedal apparatus of claim 8, wherein the fixing parts, the first axis, and the second axis are sequentially arranged in a direction from the rear to the front of the vehicle.

11. The brake pedal apparatus of claim 6, wherein
   ends of the blocking parts are inserted into guide grooves formed in the guide rails to face the guide apertures, and
   engaging protrusions are formed at the ends of the blocking parts to be hook-coupled to the guide grooves.

12. The brake pedal apparatus of claim 6, wherein upon the collision between the collision bracket and the collision rack, the blocking parts move along the guide apertures, due to a rotation of the collision rack, to open the guide rails.

13. The brake pedal apparatus of claim 2, wherein the collision rack further includes a collision member that collides with the proximal end of the pedal arm to allow the coupling shaft to move along the guide rails.

14. The brake pedal apparatus of claim 2, wherein surfaces of the guide rails that support the coupling shaft are downwardly inclined toward the rear of the vehicle.

15. The brake pedal apparatus of claim 1, further comprising:
   a hinge shaft coupled to the collision rack to be rotatable about the second axis,
   wherein the hinge shaft is rotatably coupled to hinge grooves of the fixing bracket.

16. The brake pedal apparatus of claim 1, wherein when the proximal end of the pedal arm is disengaged from the fixing bracket, the pedal arm rotates to cause the proximal end of the pedal arm to move toward the rear of the vehicle, and a distal end of the pedal arm with respect to the first axis to move toward the front of the vehicle.

* * * * *